C. A. HIRTH.
RACE FOR BALL AND CYLINDER BEARINGS.
APPLICATION FILED MAR. 24, 1915.
1,197,373.
Patented Sept. 5, 1916.
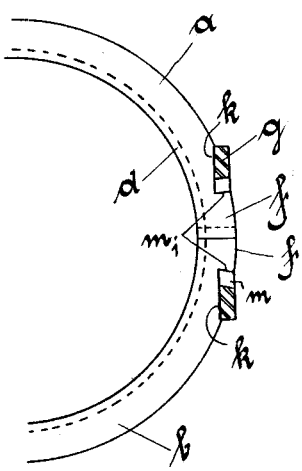
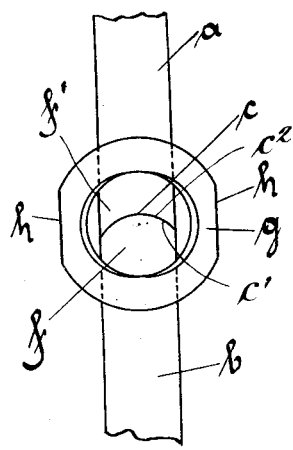

UNITED STATES PATENT OFFICE.

CARL ALBERT HIRTH, OF CANNSTATT-STUTTGART, GERMANY, ASSIGNOR TO NORMA COMPAGNIE GESELLSCHAFT MIT BESCHRAENKTER HAFTUNG, OF CANNSTATT-STUTTGART, WURTTEMBERG, GERMANY, A CORPORATION OF GERMANY.

RACE FOR BALL AND CYLINDER BEARINGS.

1,197,373.

Specification of Letters Patent.   Patented Sept. 5, 1916.

Application filed March 24, 1915.   Serial No. 16,768.

*To all whom it may concern:*

Be it known that I, CARL ALBERT HIRTH, a citizen of the German Empire, and residing at Cannstatt-Stuttgart, in the Kingdom of Wurttemberg, in said Empire, have invented certain new and useful Improvements in Races for Ball and Cylinder Bearings, of which the following is a specification.

This invention relates to a race ring for roller bearings, either ball or cylindrical, composed of sections, preferably constructed from bars or rods bent into arc-shape and having their fibers concentric to the runway of the race ring. The abutting ends of the sections have locking lugs which do not protrude beyond the periphery of the band.

The invention is shown in the accompanying drawing, and will be more fully described hereinafter and finally pointed out in the claims.

In the accompanying drawings, Figure 1 is a side view of a portion of my improved ring with the binding member partly in section, and Fig. 2 is a plan view thereof.

Similar reference numerals indicate corresponding parts throughout the figures of the drawing.

Referring to the drawing, the race ring, in the embodiment shown, consists of a ball bearing of two parts $a$ and $b$, which in the well-known manner abut at the ends against each other with convex and concave cylindrical surfaces $c^1$ and $c^2$, and which are ground on their inner faces to form a run $d$ for the balls. The two race parts $a$ and $b$ are formed by bending into a semicircular shape, drawn or rolled rods of square cross section, so that the direction of the fibers is in circles concentric to the race.

In order that the abutting joint $c$ may be held tightly together, the parts after exact grinding of the abutting ends are pressed upon each other, and then the abutting ends are provided with special cut-out portions $k$ of such form, as is seen in Fig. 1, that projections or lugs $f$ are formed on opposite sides of and parted by the joint, and which extend radially outwardly. These lugs $f$ are embraced by a clamping device. As such a clamping device, a simple ring $g$ is provided with a partly oval or partly elliptical opening of such size and measurement that the smallest width of the opening corresponds with the external diameter of the projections or lugs, while the greater width, however, permits a very easy embracing of the lugs $f$ by the ring $g$ on the application thereof. The clamping ring $g$, which is thus placed on the projections $f$ of the race ring, need only be turned around 90° by a suitable key or well-known construction (not shown) applicable to the flattened surfaces $h$ of the ring $g$, in order to press the abutting ends of the parts $a$ and $b$ together with sufficient force. Preferably also, but it is not entirely necessary, the inner opening of the clamping ring $g$, as may be seen from Fig. 1, may be tapered at one side, as indicated at $m$, and the projection $f$ in this case can be arranged correspondingly conical as indicated by $m^1$.

An important advantage of the connection described lies in the small space that is required when using the ring $g$. When such economy in space is not considered essential, any other connection is applicable, as long as no projecting parts on the inner profile of the ring are produced.

I have shown an embodiment of my invention, but it is clear that changes may be made therein without departing from the spirit thereof as defined in the appended claims.

I claim:—

1. A race ring for roller bearings comprising sectional arc-shaped members provided at their abutting ends with exterior recesses forming lugs flush with the periphery of the race ring on opposite sides of the joint between the sections, and oval ring clamps turnable in said recesses and engaging adjacent lugs for locking the sections.

2. A race ring for roller bearings comprising sectional arc-shaped members provided at their abutting ends with exterior recesses forming dovetailed lugs flush with the periphery of the race ring on opposite sides of the joint between the sections, and oval ring clamps turnable in said recesses and engaging adjacent lugs for locking the sections.

3. A race ring for roller bearings comprising sectional arc-shaped members provided with radial lugs at their abutting ends and oval clamping rings engaging said lugs.

and turnable thereon for locking said sections together.

4. An improved race ring for balls and rollers, comprising a run concentric to the direction of the fibers, lugs projecting outwardly from the run at the abutting ends of the run, the abutting ends of the lugs being flush, and clamping means embracing the lugs and holding the abutting surfaces of the lugs tightly together.

5. A race ring for roller bearings comprising sectional arc-shaped members provided at their abutting ends with exterior recesses forming lugs flush with the periphery of the race ring on opposite sides of the joint between the sections and locking means entering said recesses and engaging said lugs.

6. A race ring for roller bearings comprising a split ring provided at its abutting ends with exterior recesses forming lugs flush with the periphery of the race ring on opposite sides of the joint, and an oval ring clamp turnable in said recesses and engaging said lugs for locking said split ring.

7. A race ring for a roller bearing comprising a split ring provided at its abutting ends with lugs, and an oval ring clamp turnable on said lugs for locking said ring.

8. A race ring for a roller bearing comprising a split ring provided at its abutting ends with dovetailed lugs, and a dovetailed oval ring clamp turnable on said lugs for locking said ring.

9. A race ring for a roller bearing comprising sectional arc-shaped members provided at their abutting ends with exterior recesses forming lugs and clamping rings embracing said lugs.

In testimony, that I claim the foregoing as my invention, I have signed my name in presence of two subscribing witnesses.

CARL ALBERT HIRTH.

Witnesses:
ERNEST ENTLEMANN,
EUGEN SCHLEICHER.